United States Patent Office 3,448,619
Patented June 10, 1969

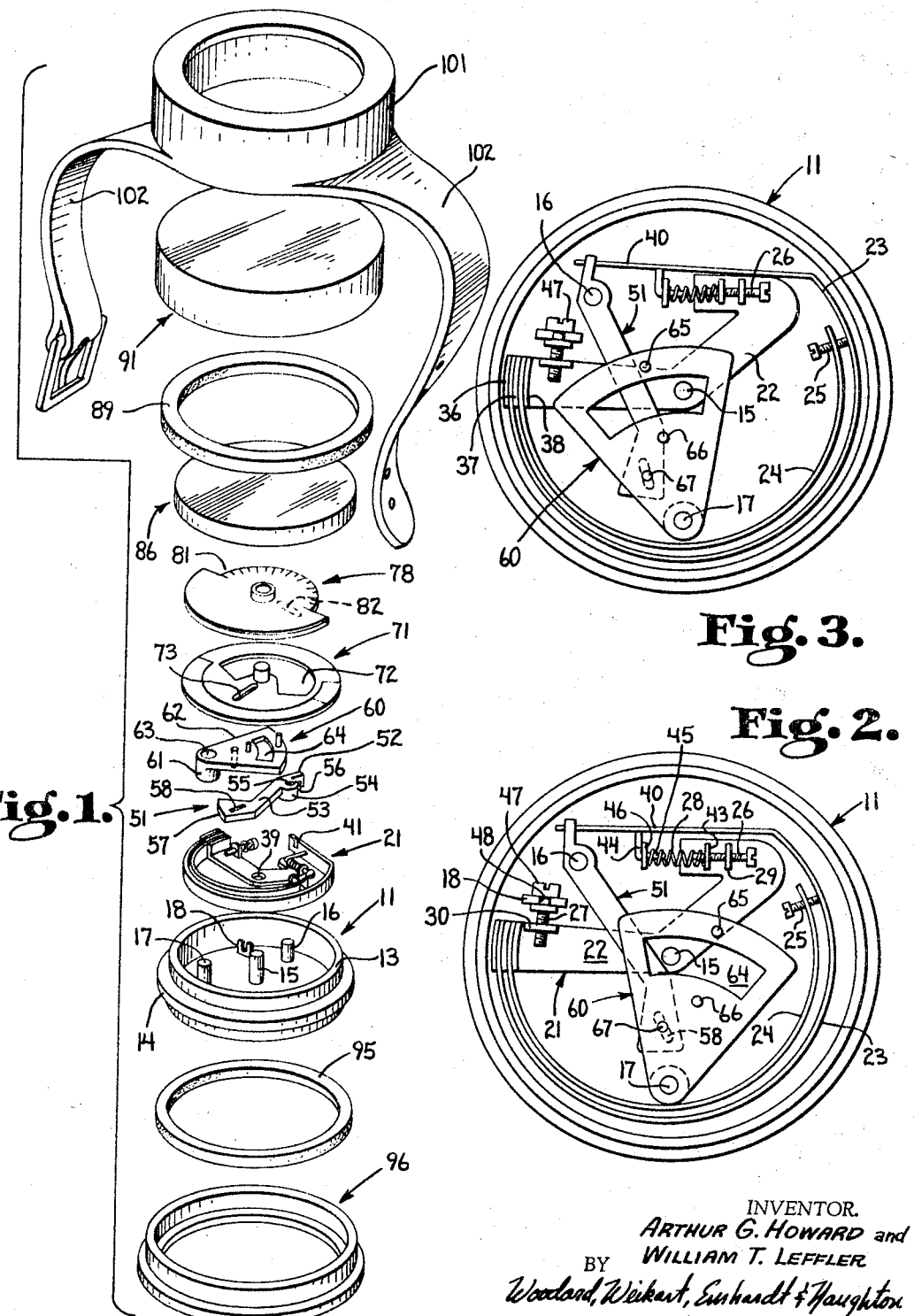

3,448,619
CLINICAL TEMPERATURE INDICATING DEVICE
Arthur G. Howard, Indianapolis, Ind., and William T. Leffler, 250 E. 70th St., Indianapolis, Ind. 46220; said Howard assignor to said Leffler
Filed June 7, 1967, Ser. No. 644,207
Int. Cl. G01k 5/64, 5/70
U.S. Cl. 73—363.7                8 Claims

ABSTRACT OF THE DISCLOSURE

A clinical temperature indicating device having an enclosure with a thermally conductive back, a thermally insulating side wall and transparent crystal. A bimetallic temperature responsive element is within the case. The back pressure is placed next to a patient's skin and as the bimetallic element senses the temperature of the skin a pair of coaxial dials visible through the crystals are driven by the bimetallic element through a linkage.

BACKGROUND OF THE INVENTION

Field of the invention

The field of the invention is generally measuring, and more particularly, thermometers with motion transferring mechanism.

Description of the prior art

Many clinical and other temperature indicating devices are known to the art. By far the most common and well-known is of the mercury-in-glass type which has been in clinical use since Carl Wnderlich introduced it in his clinic in the year 1851. More recent devices such as shown in Obermaier, 2,321,846, utilize an electrical circuit having a temperature sensitive resistance. In Finch, 2,804,722, there is disclosed a clinical thermometer having a plurality of heat deformable elements connected in series to an indicating member.

Each of the above mentioned prior art devices must generally be inserted within the body (orally, rectally or vaginally) in order to produce a reliable indication of body temperature. Also, each of them have a number of limitations and disadvantages. For example, the mercury-in-glass thermometer must be shaken down before use, is fragile and therefore easily broken, is generally difficult to read, is hazardous if broken while inserted within the body and cannot safely be used with a patient during a seizure. Most other types of thermometers are too expensive for widespread use, or have other disadvantages.

There has long existed a need for a reliable, rugged clinical temperature indicating device that need not be inserted within the body to produce a reliable temperature indication. Furthermore, such a device must be easy to read, economical in manufacture, within the price range of the average user, and should also be simple to use on any patient, infant or aged.

The present invention meets each of the requirements set forth above and avoids substantially all of the disadvantages of the prior art devices by providing a device which may simply be strapped on the patient's wrist like a wrist watch, and which, by means of a unique dial mechanism, permits a person standing across the room to see whether the patient's temperature is above "normal."

SUMMARY OF THE INVENTION

A clinical temperature indicating device having a case resembling that of a wrist watch, said case having a thermally conductive back and thermally insulated sides and transparent crystal. This arrangement insures that the temperature within the case, and therefore the temperature of bimetallic temperature responsive element within the case, will be substantially equal to the temperature of the patient's skin in contact with the thermally conductive back and that the effects of widely variant ambient temperatures will be negligible.

Through a linkage, the bimetallic temperature responsive element drives a pair of dial discs coaxially mounted upon an axis located substantially in the center of the thermally conducting back. The two discs are approximately of the same diameter, the upper disc having a semi-annular peripheral cut-out to expose a portion of the lower disc and a graduated scale for indicating the measured temperature. The lower disc has colored markings which are exposed by the upper disc when the measured temperature is above or below "normal," and has a fan-shaped cut-out through which the linkage is connected to the upper disc.

When the linkage is moved by the bimetallic temperature responsive element, the upper and lower discs are driven in opposite rotational directions to provide approximately 180 degrees of relative motion between the two discs within the temperature range for which the device is calibrated. Using a temperature range of eight degrees, which is usual for clinical thermometers, and discs of approximately one inch in diameter, the relative peripheral motion of the discs is approximately 1.6 inches in 8 degrees, or .2 inch per degree of bodily temperature change.

By using the above described disc arrangement, and color markings, the device of the present invention provides an indication, easily seen across a room, that the patient's temperature is normal or at abnormal value. If it is desired to known how much the patient's temperature is above normal, the device may be read with the same ease as a wrist watch.

Another feature of the device of the present invention is that it exhibits very short lag time. That is, the time delay between a change in the measured temperature and the indicated response is approximately four minutes. Therefore, the device of the present invention will provide an accurate indication of a patient's temperature within a relatively short time after it is placed in contact with the patient's skin, regardless of whether it has been in use on another patient or whether it has been sitting idle immediately prior to being used. This feature is due mainly to two factors; the thermally insulated case and the low thermal inertia of the back, linkage and bimetallic element.

It is therefore an object of the present invention to provide an improved clinical temperature indicating device.

It is a further object of the present invention to provide a device which need not be inserted within the patient's body to give an accurate indication of his body temperature.

It is a further object of the present invention to provide a device which is rugged and long lived, and which is economical to manufacture and within the price range of the average user.

It is another object of the present invention to provide a device which is simple to use on any patient, whether infant or aged, and which may also be used during a seizure.

A still further object of the present invention is to provide a device which will respond very quickly to changes in measured temperature.

Still another object of the present invention is to provide a device which will give an indication readable across a moderate distance when a patient's temperature is normal or at an abnormal value.

These and other objects and advantages of the present invention will become aparent as the description proceeds, reference being made to the attached drawings and appended claims.

BRIEF DESCRIPTION OF THE DRAWINGS

FIG. 1 is an exploded perspective view of the device of the present invention showing the relative positions and appearances of its several components.

FIG. 2 is a plan view of the inner case of the device of the present invention with the bimetal assembly, lever arm and yoke arm in place.

FIG. 3 is similar to FIG. 2 and shown the relative positions of the bimetal assembly, lever arm and yoke arm for a temperature different from FIG. 2.

DESCRIPTION OF THE PREFERRED EMBODIMENT

Figure 4:
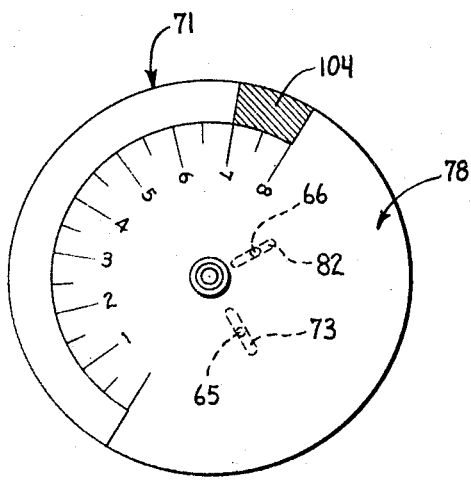
FIG. 4 is a plan view of the dials of the device showing their relative position corresponding to the position of the parts as shown in FIG. 2.

Referring now to FIG. 1, there is shown an exploded view of the temperature indicating device of the present invention. An inner case 11 is formed of thermally conductive material and has a circular back 12 and an annular sidewall 13. Integrally formed with the sidewall 13 is an outwardly extending flange 14. Integrally formed with the back 12 and extending inwardly of the inner case 11 from the back 12 are a centrally located axis pin 15, a first fulcrum pin 16 located radially from the axis pin 15, a second fulcrum pin 17 located radially from the axis pin 15 and approximately 120 degrees removed from the first fulcrum pin 16, and a slotted tab 18 located radially from the axis pin 15 and intermediate the fulcrum pins 16 and 17.

A bimetal assembly 21 has a base plate 22, a pair of bimetal elements 23 and 24, a first calibrating screw 25, a second calibrating screw 26, a dial calibrating screw 27, a compression spring 28 and upwardly extending tabs 29 and 30. One end of the base plate 22 is provided with three upstanding members 36, 37 and 38. Each of the members 36, 37 and 38 is curved with the center of curvature being the center of a circular hole 39 which, as will be more fully described below, receives the axis pin 15. The bimetal element 23 has a proximal end fixedly received between the upstanding members 36 and 37. The bimetal element 23 is substantially arcuate throughout most of its length, having a radius of curvature approximately equal to the distance from the center of the hole 39 to its proximal end when the bimetal element 23 is at a temperature approximately equal to midrange of the device. The distal end of the bimetal element 23 terminates in a straight portion 40 that substantially lies on the chord of a circle having its center at the center of the hole 39 and having an upward opening notch 41 immediately adjacent the distal end.

The bimetal element 24 has a proximal end fixedly received between the upstanding members 37 and 38, and is substantially arcuate throughout its length, having a radius of curvature approximately equal to the distance from the center of the hole 39 to its proximal end when at a temperature approximately equal to midrange of the device. Adjacent the distal end of the bimetal element 24 is a threaded hole for receiving the first calibrating screw 25, as best shown in FIGS. 2 and 3.

The upwardly extending tab 29 is located near the other end of the base plate 22 and has a threaded hole therein for receiving the second calibrating screw 26. The screw 26 has a slotted head on one end and a portion of reduced diameter on the other end. A shoulder is formed between the threaded portion and the portion of reduced diameter. A washer 43 is received on the portion of reduced diameter and seats against the shoulder. The tab 29 is so oriented that the axis of the screw 26 is substantially parallel to the straight portion 40 of the bimetal element 23. A spring tab 44 affixed to the straight portion 40 and extending perpendicularly and inwardly therefrom supports a spring pin 45 coaxially with the screw 26. A washer 46 is received on the spring pin 45 and seats against the spring tab 44. The compression spring 28 is of the spiral type and receives the spring pin 45 in one end and the portion of reduced diameter of the screw 26 in the other end. The spring 28 is compressed between the washer 43 and the washer 46.

The upwardly extending tab 30 is located on the base plate 22 inwardly of and substantially perpendicular to the upstanding member 38. In it is a threaded hole for receiving the dial calibrating screw 27. The dial calibrating screw 27 has a slotted head 47 provided with an annular groove 48 as best shown in FIGS. 2 and 3.

Above the bimetal assembly 21 in FIG. 1 is shown a lever arm 51 having a short arm portion 52 and a long arm portion 53. At the junction of the short arm portion and the long arm portion is a portion of increased cross section 54 having a fulcrum pin hole 55 therein. The lower part of the portion of increased cross section extends downwardly of the lower surface of the lever arm 51 to form a boss around the lower end of the fulcrum pin hole 55. Near the end of the short arm portion 52 is a downwardly opening notch 56.

The long arm portion 53 terminates in a trapezoidal shaped portion 57 having a slot 58 formed therein. The slot 58 is generally elongate, and positioned so that its longitudinal axis passes through the center of the fulcrum pin hole 55.

Above the lever arm 51 in FIG. 1 is shown a yoke arm 60 having a sleeve portion 61 and a pie-shaped portion 62 integral therewith. The sleeve portion 61 extends downwardly from the point of the pie-shaped portion and has a fulcrum pin hole 63 formed therein. The lower face of the sleeve portion (not shown) forms a boss around the lower end of the hole 63. The pie-shaped portion 62 has an arcuate opening 64 therein, the edges of which lie along arcs and radii having their center at the center of the hole 63. Outwardly of the opening 64 and lying substantially on a radius drawn through the center of the hole 63 and bisecting the pie-shaped portion 62 is a first upwardly extending cam pin 65. Inwardly of the opening 64 and lying substantially on the same bisecting radius is a second upwardly extending cam pin 66. A downwardly extending cam pin 67 is located a distance from the center of the hole 63 that is less than the distance from the center of the hole 63 to the second upwardly extending cam pin 66 and angularly displaced counter clockwise from the cam pins 65 and 66 as viewed in FIGS. 2 and 3. The sleeve portion 61, the pie-shaped portion 62 and the cam pins 65, 66 and 67 may be integrally formed of suitable plastic, however it may be desirable to form the cam pins 65, 66 and 67 of metal.

Above the yoke arm 60 in FIG. 1 is shown a disc-shaped lower dial 71 having a semi-annular opening 72 formed therein. Opposite the opening 72 is a radially oriented cam slot 73. There is an axle pin hole 74 centrally located in the dial 71 surrounded by a spacer 75. There are markings on the lower dial 71 to be described in detail subsequently.

Above the lower dial 71 in FIG. 1 is shown a disc-shaped upper dial 78 having a central hole 79 surrounded by a spacer 80. The dial 78 is provided with a peripheral semi-annular cut-out, indicated generally at 81 and a radial cam slot 82 located inwardly of and angularly displaced clockwise from one end of the semi-annular cut-out. The slot 82 opens to the bottom of the dial 78 but does not penetrate its upper surface. The markings on the upper dial 78 will be described in conjunction with the markings on the lower dial 71.

Shown in FIG. 1 above the upper dial 78 are an inner crystal 86 formed of transparent material and having a face portion 87 and a depending skirt portion 88, an upper insulating ring 89, an outer crystal 91 formed of transparent material and having a face portion 92, a depending skirt portion 93, and a depending annular flange portion 94. Also shown in FIG. 1 below the inner case 11 is a lower insulating ring 95 and an outer case 96.

The lower insulating ring 95 has a substantially rectangular cross section and has an inner diameter slightly larger than the outer diameter of the sidewall 13 of the inner case 11. The lower insulating ring 95 fits snugly about the lower portion of the sidewall 13, the upper surface of the insulating ring 95 mating with the lower surface of the flange 14. The outside diameter of the insulating ring 21 is made larger than the outside diameter of the flange 14.

The upper insulating ring 89 is similar to the lower insulating ring 95 in that it is formed of the same material has a substantially rectangular cross section and has the same outside diameter. Its inside diameter, however, is larger than the inside diameter of the lower insulating ring 95 so that it may fit snugly about the skirt portion 88 of the inner crystal which in turn fits snugly about the upper portion of the sidewall 13.

Figure 6:
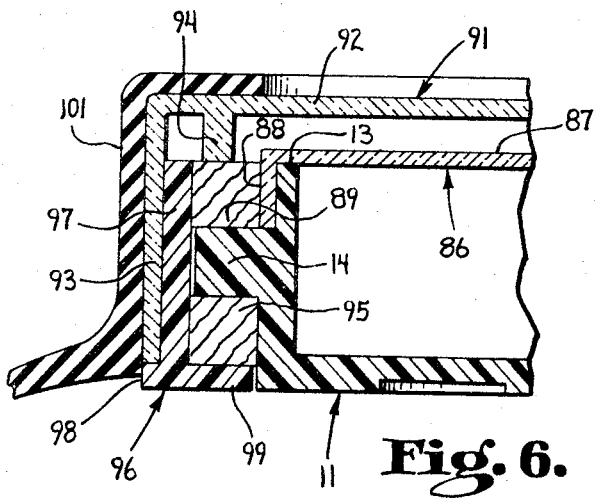
FIG. 6 is an enlarged partial cross sectional view through the device with the bimetal assembly, lever arm, yoke arm and dials removed to shown the details of construction of the case.

The outer case 96 has a sidewall 97, an outwardly directed flange 98 and an inwardly directed flange 99, as best shown in FIGS. 1 and 6. The inside diameter of the sidewall 97 is sized to snugly receive the outside diameters of the upper and lower insulating rings 89 and 95 respectively. The upper surface of the outwardly directed flange 98 provides a mating surface for the lower surface of the depending skirt portion 93 of the outer crystal. The upper surface of the inwardly directed flange 99 provides a mating surface for the lower surface of the lower insulating ring 95, and the inside diameter of the inwardly directed flange 99 is slightly larger than the outside diameter of the sidewall 13 of the inner case 11 to avoid physical contact therewith.

In assembly the device of the present invention, each of the components of the bimetal assembly 21 is assembled as shown in FIGS. 1, 2 and 3. The bimetal assembly 21 is then mounted in the inner case 11 so that the axis pin 15 is received through the circular hole 39 of the base plate 22 and the annular groove 48 of the screw head 47 of the dial calibrating screw 27 is received in the slot of the slotted tab 18.

Next, the lever arm is placed over the bimetal assembly 21 so that its fulcrum pin hole 55 receives the fulcrum pin 16 and its downward opening notch 56 fits into the upward opening notch 41 near the distal end of the bimetal element 23 to form a pivotal coupling. The lower surface of the portion of increased cross section 54 that forms a boss about the lower end of the fulcrum pin hole 55 mates with the inside of the back 12 of the inner case 11 to act as a bearing surface and to position the lever arm 51 axially on the fulcrum pin 16.

The yoke arm 60 is then placed over the lever arm 51 so that the fulcrum pin hole 53 receives the fulcrum pin 17 and the downwardly extending cam pin 67 is received in the slot 58 of the lever arm 51. The axis pin 15 lies within the arcuate opening 64. The sleeve portion 61 functions to position the yoke arm 60 axially on the fulcrum pin 17 and its lower surface mates with the inside of the back 12 to form a bearing surface.

The lower dial 71 is positioned with its center hole 74 receiving the axis pin 15, its cam slot 73 receiving the upwardly extending cam pin 66 of the yoke arm 60 and the cam pin 65 extending through the semi-annular opening 72. The spacer 75 functions to position the lower dial 71 axially on the axis pin 15.

The upper dial 78 overlies the lower dial 71, the axis pin 15 being received in the central hole 79 and the cam slot 82 receiving the upstanding cam pin 65. The inner radius of the cut-out 81 is larger than the outer radius of the semi-annular opening 72 so that the semi-annular opening 72 is substantially covered by the upper dial 78.

The inner case 11, the insulating rings 89 and 95, the outer case 96, the inner crystal 86 and the outer crystal 91 fit together to form an enclosure as shown in detail in FIG. 6. The inner surface of the depending skirt portion 88 of the inner crystal, as stated above, fits snugly around the upper portion of the sidewall 13. The upper insulating ring 89 fits around the skirt portion 88 with its lower surface mating with the upper surface of the flange 14.

The lower insulating ring 95 fits snugly around the lower portion of the sidewall 13 with its upper surface mating with the lower surface of the flange 14. The inside of the sidewall 97 of the outer case 96 fits snugly around the upper and lower insulating rings, as described above, with the upper surface of its inwardly directed flange 99 mating with the lower surface of the lower insulating ring 95.

The inner surface of the depending skirt portion 93 of the outer crystal 91 fits snugly around the outer surface of the sidewall 97 of the outer case 96, the lower surface of the depending annular flange portion 94 mating with the upper surface of the upper insulating ring 89.

The assembled device may then be received within a protective jacket 101, which may be formed of soft rubber and may have integral straps 102 for holding the device against a person's skin, for example on his wrist or on his forehead.

It will be seen with reference to FIG. 6 that the inner case 11 and inner crystal 86 are supported entirely by the upper and lower insulating rings 89 and 95 respectively and do not contact the outer case 96 or the outer crystal 91. There is a dead air space between the inner and outer crystals, and between the periphery of the flange 14 and the outer case sidewall 97. This structure is quite effective in insulating the inner case 11 from the effects of ambient room temperatures. With the back of the inner case 11 in contact with a patient's skin, the bimetal elements within the inner case very rapidly reach the temperature to be measured.

The structure of the device having been fully described, description will now be made of the operation and calibration thereof.

Each of the bimetal elements 23 and 24 is formed with its high expansion portion to the inside. Therefore, the radius of curvature of each bimetal element will increase with increasing temperature and decrease with decreasing temperature. This may be seen with reference to FIGS. 2 and 3 which depict the relative positions of the bimetal elements at the "normal" body temperature and at an "above normal" temperature respectively.

Because of the structure of the bimetal assembly 21, most of the calibrating of the device may be performed on a test block before the assembly is mounted within the inner case 11. The test block (not shown) duplicates the pin and tab arrangement of the inner case but has no sidewall to obstruct access to the calibrating screws. On the test block, the bimetal assembly is brought to a predetermined calibrating temperature. This temperature will depend upon the portion of the patient's body where the device is intended to be used, as will be described in detail subsequently.

With the assembly at the calibrating tmperature, the first calibrating screw 25 is withdrawn until its end is not contacting the bimetal element 23. Then the second calibrating screw 26 is rotated to adjust the compression of the spring 28 to a predetermined value. Next, the first calibrating screw 25 is rotated until its end just touches the bimetal element 23. The assembly may then be removed from the test block and mounted in an inner case 21, and a lever arm 51 and a yoke arm 60 also put in place. The dial calibrating screw 27 may then be adjusted to angularly position the bimetal assembly with respect to the fulcrum pin 16, and thereby adjust the position of the yoke arm 60, which in turn positions the dials 71 and 78. If, for example, the midrange temperature is chosen as the calibration temperature, then at the calibration temperature the yoke arm should be positioned with the upwardly extending cam pins 65 and 66 lying on the line passing through the center of the axis pin 15 and the fulcrum pin 17. In this position, the dials are at midrange of their scale.

The device of the present invention was originally conceived and constructed with only one bimetal element. No compression spring was used. This embodiment functioned satisfactorily, but required that the linkage and dial system have extremely low friction. In order to overcome the requirement of such low friction in the linkage and dial system, the second bimetal element 24 and its calibrating screw were added, bimetal element 24 being mechanically in parallel with the first bimetal element 23. This addition premitted somewhat more friction to be tolerated in the linkage and dial system and also increased the repeatability and accuracy of the device. The spring 28 and the calibrating screws 25 and 26 provide means for setting the bandwidth of measurable temperatures.

When properly calibrated, the relative positions of the various parts will be substantially as shown in FIG. 2 for that temeparture which is "normal." The relative positions depicted in FIG. 3 correspond approximately an indication of 8 degrees Fahrenheit above normal. It will be seen, with reference to FIG. 2 showing the relative positions for "normal," that the cam pins 65 and 66 form an angle of approximately 90 degrees with the axis pin 15. An increase in temperature causes the bimetal elements to increase in radius of curvature and to move the short arm portion 52 of the lever arm 51 clockwise. This clockwise movement is transmitted through the long arm portion 53 via the slot 58 to the downwardly extending cam pin 67 of the yoke arm 60, thereby moving the yoke 60 counterclockwise about the fulcrum pin 17. An increase of approximately 8 degrees Fahrenheit will move the yoke arm from the position shown in FIG. 2 to the position shown in FIG. 3. It will be seen that as the yoke arm moves from the position of FIG. 3 that the angle between the cam pins 65 and 66 first increases, reaches a maximum of 180 degrees when the bimetal elements are at a temperature approximately equal to the midrange temperature, and then begins to decrease on the other side of the axis pin 15 until it is again approximately 90 degrees.

With the lower dial following the angular position of the cam pin 66 and the upper dial following the angular position of the cam pin 65, it will be seen that in moving from the position of FIG. 2 to the position of FIG. 3 the yoke arm causes the upper and lower dials to move 180 degrees relative to each other.

When the temperature of the bimetal elements is "normal," the position of the upper and lower dials is as shown in FIG. 4. The positions of the two cam pins 65 and 66 are shown in broken lines. Similarly, when the temperature of the bimetal elements is approximately 8 degrees Fahrenheit above normal, the position of the upper and lower dials is as shown in FIG. 5, which also shows the positions of the cam pins 65 and 66.

Figure 5:
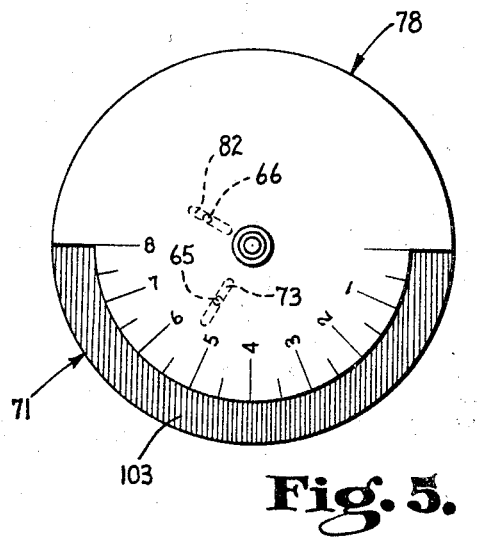
FIG. 5 is a plan view of the dials of the device showing their relative position corresponding to the position of the parts as shown in FIG. 3.

A portion 103 of the lower dial 71, shown by vertical hatching in FIG. 5, may be colored red to permit a person to easily see from across a room when the patient has a fever. This portion is completely covered by the upper dial 78 when the patient's temperature is normal. Similarly, another portion 104 of the lower dial, shown in oblique hatching in FIG. 4, may be colored green to give a ready indication that the patient's temperature is approximately normal. The lower dial 71 is also provided with a graduated scale to indicate the number of degrees Fahrenheit that the patient's temperature is above normal, or in other words, the degrees of fever. Because wrist temperature, or whatever other skin temperature is used, differs from oral temperature, use of the device is simplified by calibrating the dial directly in degrees of fever rather than having the user translate the actual reading to the equivalent oral reading to determine whether the patient has a fever.

It will be apparent to persons skilled in the art of linkages that the linkage of the device of the present invention is nonlinear. Because of certain cancelling effects of inherent nonlinearities, and also because of the small relative movement of some of the parts of the linkage, the resultant relative motion of the upper and lower dials is substantially linear with respect to the oral temperatures corresponding to the measured skin temperatures. One reason for this is that skin temperature, whether wrist or forehead, is nonlinear with respect to oral temperature. For example, the wrist temperature corresponding to an oral temperature of 98.6 degrees Fahrenheit ("normal"), is 92 degrees, a difference of 6.6 degrees Fahrenheit. The wrist temperature corresponding to an oral temperature of 104.6 degrees Fahrenheit (a "fever" of 4 degrees Fahrenheit) is 95.8 degrees Fahrenheit, a difference of 3.8 degrees Fahrenheit. In general, the higher a person's temperature, the greater the difference between his oral temperature and his skin temperature. For the best accuracy, the temperature scale on the upper dial may be made compensatingly nonlinear. For sake of simplicity, however, the drawings of FIG. 4 and 5 show linear temperature scales.

In operation, the device of the present invention is placed with the back surface of the inner case in contact with the appropriate part of the patient's skin, for example the inner surface of his wrist (above the median artery), and the straps 102 fastened to hold it in place. Because of the highly efficient insulating properties of the case and crystal construction and because of the low thermal inertia of the bimetal elements and other parts within the inner case, the temperature within the inner case becomes the same as the temperature of the patient's skin which the back of the case is in contact. An accurate temperature reading may be made in a relatively short time after the device is placed in contact with the patient's skin.

It will be seen that the above described clinical temperature indicating device provides a device which need not be inserted within the patient's body to give an accurate indication of his body temperature. The device is rugged and long lived, economical to manufacture and may be made available to the public within the price range of the average user. The cases and crystals may be made of tough nonstaining plastic and the entire enclosure may be made water and dust proof. The device of the present invention may be used with patients, infant or aged, even during a seizure and responds very quickly to changes in temperature. It, of course, need not be "shaken down" and because it is not inserted within the body, need not be sterilized before each use.

While the invention has been illustrated and described in detail in the drawings and foregoing description, the same is to be considered as illustrative and not restrictive in character, it being understood that only the preferred embodiment has been shown and described and that all changes and modifications that come within are also desired to be protected. For example, the cam pin and cam slot combinations may be reversed, the pin being affixed to the member shown with the slot and vice versa. Also, the strap 102 may be variously adapted for use on the other parts of the body, such as the forehead, or in a band-halter on the abdomen, in which cases, of course, a change in calibration of the instrument must be made.

The invention claimed is:

1. A clinical temperature indicating device comprising: an enclosure, a bimetal assembly mounted within said enclosure, first and second dials rotatably and coaxially mounted within said enclosure, linkage means mounted within said enclosure and coupling said bimetal assembly to said dials, said bimetal assembly including a base plate and first and second bimetal elements with said second bimetal element being connected mechanically in parallel with said first bimetal element, said first bimetal element having a proximal end affixed to said base plate and a distal end coupled to said dials by said linkage means, and calibrating means for setting the bandwidth of measurable temperatures, said calibrating means including a first calibrating screw mounted in said second bimetal element having an end arranged to contact the first bimetal element, a spring mounted between said first bimetal element and said base plate and a second calibrating screw for adjusting the compression of said spring.

2. A clinical temperature indicating device comprising: an enclosure, a bimetal assembly mounted within said enclosure, first and second dials rotatably and coaxially mounted within said enclosure, and linkage means mounted within said enclosure and coupling said bimetal assembly to said dials, said linkage means including a lever arm pivotally mounted within said enclosure, said lever arm having a short arm portion and a long arm portion, said short arm portion being pivotally coupled to said bimetal assembly and a long arm portion having a cam slot therein, and means interconnecting said cam slot and said dials for rotating said dials upon rotation of said lever arm.

3. The invention according to claim 2 wherein said linkage means further includes a yoke arm pivotally mounted within said enclosure, said yoke arm having a sleeve portion and a fan shaped portion with an arcuate opening therein, a downwardly extending cam pin adapted to be received within said cam slot of said lever arm, a first upwardly extending cam pin outwardly of said arcuate opening and a second upwardly extending cam pin inwardly of said arcuate opening, each of said cam pins rotating a separate one of said dials.

4. The invention according to claim 3 wherein said first dial has a semi-annular opening and a substantially radial cam slot, said second dial has a downwardly opening substantially radial cam slot, said first upwardly extending cam pin extending through said semi-annular opening and engaging said downwardly opening cam slot of said second dial and said second upwardly extending cam pin engaging said cam slot of said first dial.

5. A clinical temperature indicating device comprising: an enclosure, a bimetal assembly including a base plate mounted within said enclosure, first and second dials rotatably and coaxially mounted within said enclosure, and linkage means mounted within said enclosure and coupling said bimetal assembly to said dials, said enclosure including an inner case having a back and a sidewall and further comprising means for mounting said bimetal assembly within said inner case, said means for mounting said bimetal assembly within said inner case including an axis pin extending inwardly from the back of said inner case, said base plate of said bimetal assembly having a hole for receiving said axis pin, a slotted tab extending inwardly from the back of said inner case, a dial calibrating screw threadedly coupled to said base plate and having a slotted head with an annular groove adapted to be received within said slotted tab.

6. A clinical temperature indicating device comprising: an enclosure, a bimetal assembly mounted within said enclosure, first and second dials rotatably and coaxially mounted within said enclosure, and linkage means mounted within said enclosure and coupling said bimetal assembly to said dials, said enclosure including an inner case having a back and a sidewall and further comprising means for mounting said bimetal assembly within said inner case, said enclosure further including an inner crystal having a face portion and a depending skirt portion, said skirt portion being received over the upper portion of the sidewall of said inner case, an upper insulating ring received about the skirt portion of said inner crystal, a lower insulating ring received about the lower portion of the sidewall of said inner case, an outer case surrounding said inner case, said inner crystal and said insulating rings and in contact with said insulating rings, and an outer crystal having a face portion and a depending skirt portion, the skirt portion of said outer crystal being received about said outer case.

7. A temperature indicating device comprising two superimposed indicating members adapted for counter-rotation with respect to each other and to provide a temperature indication within a predetermined temperature range, a first thermally responsive element moveable in response to temperature change, a linkage assembly connecting said thermally responsive element to said indicating members for providing the force necessary for rotation of said members, and a second thermally responsive member for applying to said linkage upon a temperature change in additional force aiding the force exerted by said first thermally responsive member, and means for adjusting the temperature at which said second thermally responsive member applies said additional force to said linkage.

8. A temperature indicating device as claimed in claim 7 in which said first and second thermally responsive members are arcuately formed bimetal blades mounted at one end and extending generally parallel to each other, said second bimetal blade carrying an adjustable abutment at its free end adapted to engage the adjacent surface of said first bimetal blade to thus apply said additional force to said linkage, said temperature adjusting means comprising said adjustable abutment.

References Cited
UNITED STATES PATENTS

| | | | |
|---|---|---|---|
| 2,371,603 | 3/1945 | Bradley | 73—363.7 |
| 2,866,338 | 12/1958 | Muncheryan | 73—363.7 XR |
| 3,053,090 | 9/1962 | Ingersoll et al. | 73—336 |

LOUIS R. PRINCE, *Primary Examiner.*

WILLIAM A. HENRY II, *Assistant Examiner.*